United States Patent [19]

Moshenberg

[11] Patent Number: 5,020,003

[45] Date of Patent: May 28, 1991

[54] GRAPHICS CONTROLLER IMAGE CREATION

[75] Inventor: David Moshenberg, Marlboro, N.J.

[73] Assignee: AT&T Bell Laboratories, Murray Hill, N.J.

[21] Appl. No.: 250,889

[22] Filed: Sep. 29, 1988

[51] Int. Cl.[5] .......... G06F 3/14

[52] U.S. Cl. .......... 364/518; 364/900; 364/937.2; 364/943; 364/949.71; 364/961; 364/961.1

[58] Field of Search ... 364/200 MS File, 900 MS File, 364/521, 518

[56] References Cited

U.S. PATENT DOCUMENTS

| | | | |
|---|---|---|---|
| 4,555,775 | 11/1985 | Pike | 364/900 |
| 4,864,517 | 9/1989 | Maine et al. | 364/521 |
| 4,873,652 | 10/1989 | Pilat et al. | 364/518 |
| 4,890,257 | 12/1989 | Anthias et al. | 364/521 |
| 4,903,217 | 2/1990 | Gupta et al. | 364/521 |
| 4,903,218 | 2/1990 | Longo et al. | 364/521 |

OTHER PUBLICATIONS

"X-Window System", vol. 1, 1987, Adrian Nye, Author/Publisher, *O'Reilly Assoc.*

"High-Performance Color Graphics on the PC AT", Matrox, PG-1281, DS-5465, Nov./87.

*Primary Examiner*—Gareth D. Shaw
*Assistant Examiner*—Kevin A. Kriess
*Attorney, Agent, or Firm*—Frederick B. Luludis

[57] ABSTRACT

The conversion of a drawing instruction into respective pixmap locations resident in main memory is typically performed by a host processor when an associated graphics processor cannot access the main memory. Such conversion is enhanced by employing a common pixmap accessible to the graphics processor, and arranging the host processor so that it changes a drawing instruction which references a respective pixmap into one which references the common pixmap. The changed drawing instruction is then passed to the graphic processor for conversion into respective memory locations resident in the common pixmap. Thereafter, the contents of the common pixmap is transferred to the block of main memory reserved for the respective pixmap.

5 Claims, 3 Drawing Sheets

GRAPHICS CONTROLLER IMAGE CREATION

TECHNICAL FIELD

The invention relates to bit-mapped graphics arrangements, and more particularly relates to bit-mapped graphics arrangements employing so-called pixmaps.

BACKGROUND OF THE INVENTION

An image or pattern that is to be displayed on a display is typically defined by a series of drawing instructions contained in an application program. A drawing instruction may be, for example, an instruction to display a rectangle at a particular location on the display. To draw an image on a bit-mapped display means that the drawing instruction has to be converted into respective picture element (pixel) locations. The process of converting a drawing instruction into respective pixel locations is not a trivial exercise and may consume an inordinate amount of time to do so when the image is complex.

In addition, a complex image may be defined in a so-called memory-resident pixmap before it is copied to a screen (frame) buffer for display. This is done so that the complete image may be displayed in one frame interval, rather than over a series of frame intervals, as would be the case where a pixmap is not used. To define an image in a memory-resident pixmap means that a computer, such as the host processor in a workstation, converts drawing instructions into pixmap locations representative of respective pixel locations. Consequently, the response time of a host processor, and hence the workstation, deteriorates whenever the host processor is converting drawing instructions representative of a complex image into memory-resident pixmap locations.

SUMMARY OF THE INVENTION

The response time of a workstation is significantly enhanced by advantageously employing the workstation screen controller, which cannot access the resident-memory pixmap, to convert drawing instructions into pixel locations, in which the pixel locations are determined respective to a common pixmap accessible to both the host computer and controller. The contents of the common pixmap is thereafter transferred to the memory-resident pixmap following conversion of the drawing instructions.

DETAILED DESCRIPTION

Figure 1:
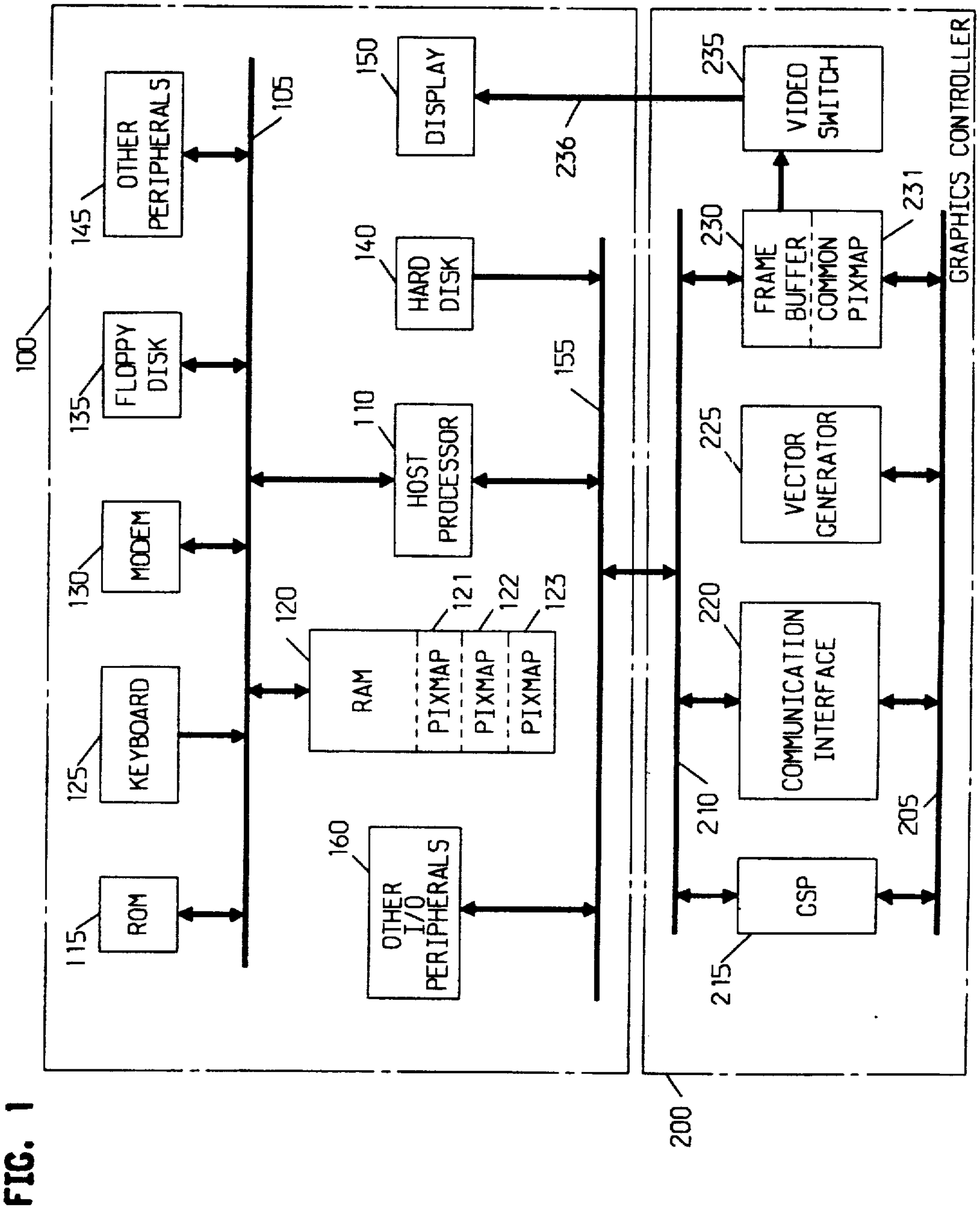
FIG. 1 is a block diagram of a workstation in which the invention may be practiced.

Turning now to FIG. 1, there is shown a simplified block diagram of workstation 100. At the heart of workstation 100 is host processor 110 which communicates with its peripheral circuits via a local bus 105. These peripherals include ROM 115, RAM 120, keyboard 125, modem 130, floppy disk unit 135, respectively, and various other peripherals denoted collectively at 145. Host processor 110 also communicates with other peripheral circuits via an I/O bus 155, which conforms with the well-known IBM corporation AT BUS standard. These latter peripherals include hard disk unit 140 and the I/O peripherals denoted collectively at 160.

Workstation 100 also includes a high-resolution graphics display 150. Display 150 is a so-called dot matrix display 100 having illustratively 1280 rows of 1024 columns of pixels for each row.

Associated with workstation 100 is graphics controller 200, which may be, for example, the PG-1281 graphics controller available from Matrox Electronic Systems Ltd located in Dorval, Quebec, Canada. Unlike host processor 110, graphics controller 200 is specifically designed to rapidly and efficiently convert a drawing instruction into respective pixel locations. Graphics controller 200 includes bus 210, which conforms to the aforementioned AT BUS standard. A bus connection is established between bus 155 and bus 210 when graphics controller 200 is plugged into a respective workstation 100 connector (not shown). Hereinafter busses 155 and 210 will be collectively referred to as the AT bus.

At the heart of graphics controller 200 is graphics system processor (GSP) 215 which communicates with its peripheral circuits via a local bus 205. These peripherals include, inter alia, communication interface buffer 220, vector generator 225, and frame buffer 230. Graphics system processor 215 manages the various graphics functions associated with display 150. These graphic functions include, for example, refresh operations, screen updates and accesses, and screen formats. Graphics system processor 215 also processes interface instructions that host processor 110 may load into communication interface 220 via the AT bus. An interface instruction may be, for example, a request to convert a drawing instruction into respective pixel locations which define the respective drawing, or image, on display 150.

An image (pattern) that is displayed on display 150 is defined by storing the pixel values thereof as determined by graphics system processor 215 in respective frame buffer 230 memory locations. In an illustrative embodiment of the invention, frame buffer 230 is a memory, such as RAM, comprising 1280 rows of 1024 eight-bit memory locations for each row, with each memory location corresponding to a respective display 150 pixel location. Host processor 110 may access the memory containing frame buffer 230 via the AT bus.

Drawing instructions, or commands defining an image that is to be displayed on display 150 are typically stored in memory, such as hard disk 140, as part of a so-called application program. In an illustrative embodiment of the invention, an application program designed to paint an image on display 150 is supported by the well-known X Window system available from the Massachusetts Institute of Technology. Host processor 110 responsive to a drawing instruction contained in an application program loads the instruction into communication interface buffer 220 via the AT bus. Graphics systems processor 215, which monitors the contents of communication interface buffer 220, unloads the instruction therefrom and quickly converts it into pixel values and loads the values into respective frame buffer 230 memory locations. The pixel values define, for example, the thickness and/or color of a line, such as, for example, the perimeter of a rectangle. The contents of frame buffer 230 is then transported row-by-row during each video frame to display 150 for display thereat.

An application program may also contain drawing instructions and/or commands specifying that an image is to be "drawn" in a memory-resident pixmap, for example, pixmap 121 of memory 120, rather than in frame buffer 230. Heretofore, when such an instance occurred, host processor 110 could not take advantage of the graphics processing power of graphics systems processor 215 to convert a drawing instruction into pixel locations when the instruction referenced a memory-resident pixmap. The reason for this is that graphics systems processor 215 does not have access to memory 120. In addition, graphics systems processor 215 would convert such a drawing instruction into respective frame buffer 230 locations, rather that respective memory-resident pixmap locations, such as the memory locations within pixmap 121. Consequently, host processor 110 would have to convert such drawing instructions itself, and, therefore, would consume an inordinate amount of processing time in doing so.

This problem is obviated by, in accordance with the invention, arranging the memory containing frame buffer 230 to include a common, or off-screen, pixmap 231. In an illustrative embodiment of the invention, off-screen pixmap 231 comprises illustratively 768 rows of 1024 eight bit memory locations each row.

In particular, host processor 110 is programmed in accordance with the invention to pass to graphics controller 200 drawing instructions which define an image in a pixmap resident in memory 120. However, since such drawing instructions reference memory 120, host computer is further programmed to change the memory address contained in each such drawing instruction so that it references common pixmap 231. The changed instruction is then loaded (stored) into communication interface buffer 220 via the AT bus. Graphics systems processor 220 unloads the drawing instruction and converts it into pixmap 231 locations and stores the respective pixel values at those locations. Thereafter, host processor 110 may transfer the contents of pixmap 231 to the AT bus for storage in a pixmap resident in memory 120.

Figure 2:
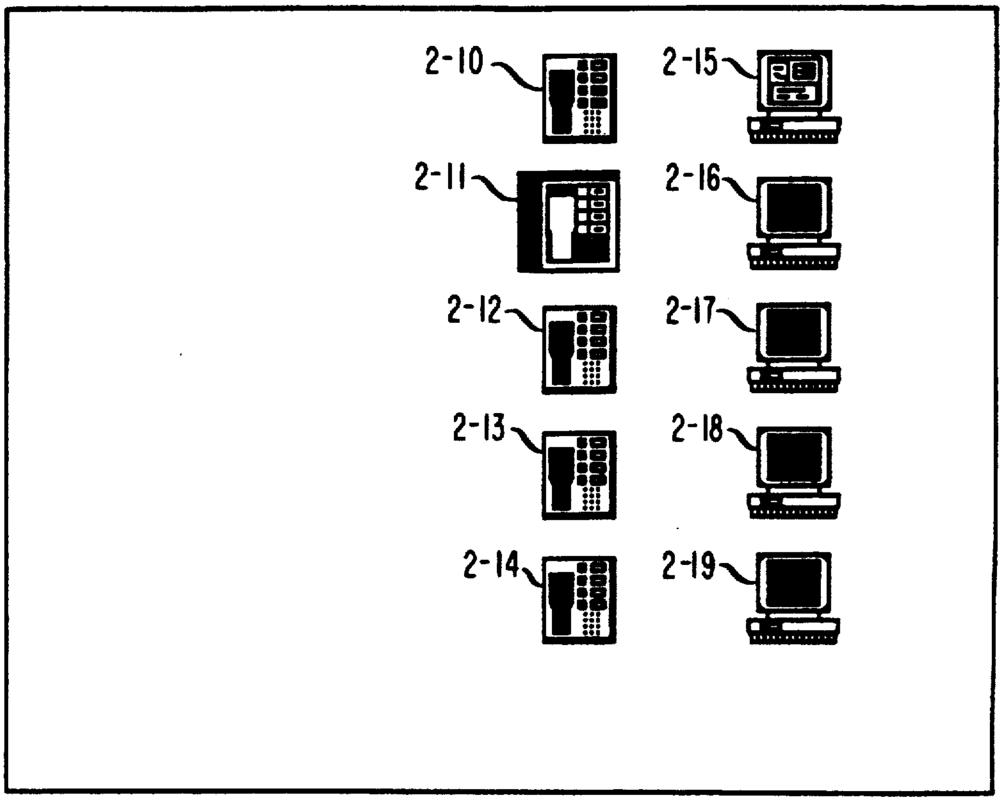
FIG. 2 illustrates a so-called window containing a number of icons useful in understanding the invention.

For example, an application program may be designed to draw a so-called window containing a number of images, such as icons, as shown in FIG. 2. It is seen from FIG. 2, that icons 2-10 through 2-14, which represent telephone station sets, and icons 2-15 through 2-19, which represent display terminals, are generally formed from rectangles (or tiles) of different sizes. Accordingly, the application program could be designed to comprise a series of drawing instructions each specifying the dimensions of a respective rectangle and the frame buffer 230 or memory-resident 120 pixmap location at which the rectangle is to be drawn. In the X Window system, an instruction for drawing a rectangle is specified using the following format:

XDrawRectangle(display, d, gc, x, y, width, height)

in which the field "display" is used to specify the address of the display that the instruction will be drawn on: field "d" is used to reference either a pixmap resident in memory 120 or frame buffer 230; field "gc is used to specify the graphics context; fields "x" and "y" are used to specify the coordinates of the upper-left-hand corner of the rectangle; and fields "width" and "height", are used to specify the width and height of the rectangle in pixels.

It is noted that if the application program is designed efficiently, it would draw a station set icon and display terminal icon in respective memory-resident 120 pixmaps, such as pixmaps 121 and 122, respectively. The application program would then replicate each icon the desired number of times, i.e., five times, in a memory 120 pixmap defining the outline of the window, the memory 120 pixmap being, for example, pixmap 123. The application program may do this by, for example, inserting the contents of each icon's pixmap in the latter pixmap using the well-known programming techniques of "cutting" and "pasting".

Thus, an application program desired to draw the window depicted in FIG. 2 would contain a series of drawing instructions each defining a respective part (rectangle) of the station set icon. The application program would also contain a second series of drawing instructions each defining a respective part of the display terminal icon. A final drawing instruction would define the rectangular border of the window. In addition, each series of drawing instructions including the instruction to draw the window would identify a respective pixmap, such as one of the pixmaps 121 through 123.

In an illustrative embodiment of the invention, a binary address is used in the "d" field of a drawing instruction to distinguish frame buffer 230 from a memory 120 pixmap. Accordingly, the binary address "000" is reserved for frame buffer 230 and the remaining addresses (001 through 111) are reserved for pixmaps resident in memory 120. Thus, one of the initial tasks performed by host processor 110 is to check the address contained in the "d" field of a drawing instruction. If the address identifies frame buffer 230, then host processor 110 passes the instruction to graphics system processor 215.

If, on the other hand, the address identifies a memory-resident 120 pixmap, then host processor 110 determines if a block of memory 120 has been allocated to the respective binary address for use as a pixmap. Host processor 110 makes this determination by maintaining in memory 120 a number of records associated with respective binary addresses 001 through 111 for the storage of the addresses of the respective pixmaps. Accordingly, host processor 110 unloads the contents of the record associated with the address contained in the "d" field of the drawing instruction that is currently being processed. If the contents of the record is clear, i.e., contains all zeros, then host processor 110 (a) clears a block of memory 120 (i.e., loads zeros in the respective memory locations) and assigns the block to the binary address contained in the "d" field, and (b) stores in the associated record the starting address of the assigned block of memory. In addition, host processor 110 stores the binary address in a memory 120 record reserved for common pixmap 231. The reason for this latter processing step will be made apparent below. Host processor 110 then changes the drawing instruction so that it references pixmap 231 and loads the instruction into communication interface buffer 220, as mentioned above. Host processor 110 then processes the next instruction of the application program while graphics system processor 215 is converting the previous drawing instruction into off-screen pixmap 231 pixel locations.

In processing the next drawing instruction, host processor 110 compares the binary address contained in the "d" field of that instruction with the binary address contained in the record reserved for pixmap 231. Host processor 110 does this to determine if the current instruction and preceding instruction of the application program identify the same memory-resident pixmap. If host processor 110 finds that to be the case, then it changes the current instruction in the manner discussed above and passes it to graphics system processor 115 for conversion. If host processor 110 finds that not to be the case, then it causes the contents of off-screen pixmap 231 to be transferred to the respective memory-resident pixmap. Host processor 110 then determines if a memory-resident pixmap has been assigned to the binary address contained in the "d" field of current instruction, in the manner discussed above.

If host processor finds that a memory-resident pixmap has been so assigned, then it (a) transfers to common pixmap 231 the contents of the respective memory-resident pixmap, (b) stores in the record reserved for common pixmap 231 the binary address contained in the current instruction, (c) changes the instruction as discussed above, and (d) passes it to graphics system processor 215. If a memory-resident pixmap had not been so assigned, then host processor proceeds in the manner discussed above in detail.

Figure 3:
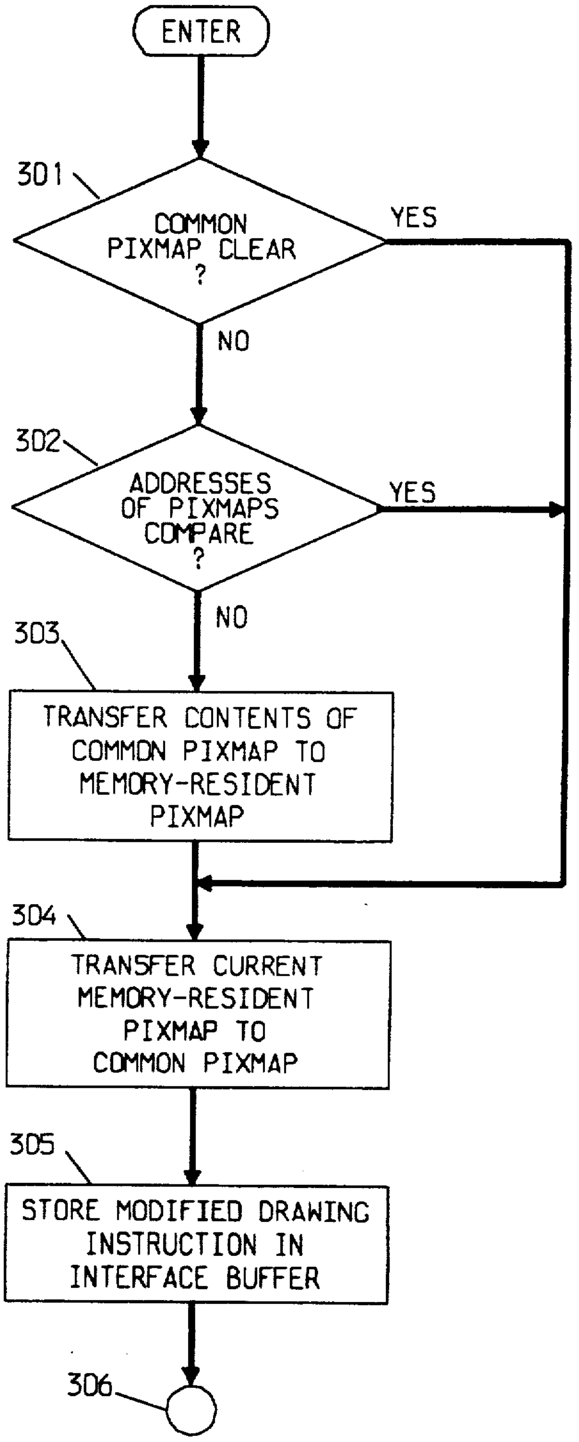
FIG. 3 is a flow chart depicting the operation of the host processor shown in FIG. 1 in relation to processing a drawing instruction.

Turning now to FIG. 3, there is shown a flowchart of the software program which implements the invention in host processor 110. Specifically, the operating system contained in host processor 110 proceeds to block 301 whenever it encounters a drawing instruction. At block 301, the program determines whether an image is currently being stored in off-screen pixmap 231. As discussed above, the program makes this determination by checking to see if the contents of the record associated with off-screen pixmap 231 contains the identity of a memory-resident pixmap. The program proceeds to block 302 if it finds that to be the case. Otherwise, it proceeds to block 304.

At block 302, the program proceeds to block 303 if it finds that the address contained in the off-screen pixmap 231 record does not compare with the address contained in the "d" field of the current drawing instruction. Otherwise, it proceeds to block 304. At block 303, the program moves, or transfers the contents of off-screen pixmap 231 to the memory-resident pixmap whose address is contained in the memory 120 record associated with off-screen pixmap 231. The program then proceeds to block 304. It is noted that the process of moving the contents of the off-screen pixmap to a memory-resident pixmap clears pixmap 231.

At block 304, the program (a) transfers to off-screen pixmap 231 via the AT bus the contents of the memory-resident pixmap identified in the current drawing instruction and (b) stores the address of that memory-resident pixmap in the record associated with off-screen pixmap 231. The program then loads the modified drawing instruction into the communication interface buffer, in the manner discussed above. The program then exits via block 306, thereby returning control to the application program.

The foregoing is merely illustrative of the principles of the invention. Those skilled in the art will be able to devise numerous arrangements which, although not explicitly shown or described herein, embody those principles and are within its spirit and scope.

I claim:

1. A graphics system for use in a workstation having a display comprising at least first and second memories each having a plurality of memory locations, blocks of locations in said first memory being allocated for use as respective resident pixmaps, and a block of locations in said second memory being allocated for use as an off-screen pixmap, a graphics processor for defining in respective memory locations of a memory identified in a drawing instruction an image specified by said drawing instruction, means, responsive to receipt of a drawing instruction specifying a particular image and identifying one of said resident pixmaps, for changing said drawing instruction so that it identifies said off-screen pixmap, for supplying said changed drawing instruction to said graphics processor and for transferring to said one of said resident pixmaps the contents of said off-screen pixmap when said image has been defined in said off-screen pixmap.

2. The system set forth in claim 1 wherein said drawing instruction is one of a plurality of drawing instructions contained in an associated application program and wherein said means for transferring includes means, operative when a subsequent drawing instruction specifies another one of said resident pixmaps, for then transferring to said one resident pixmap said contents of said off-screen pixmap.

3. A system for processing a drawing instruction having a plurality of fields, information contained in ones of said fields being indicative of an image, at least another one of said fields identifying one of a plurality of memory resident pixmaps in which said image is to be defined, said system comprising a first memory having a plurality of memory locations, blocks of locations in said first memory being allocated for use as respective ones of said pixmaps, a second memory having a plurality of memory locations, at least one block of locations in said second memory being allocated for use as an off-screen pixmap, and means, responsive to receipt of said drawing instruction, for defining said image in said off-screen pixmap as a result of said at least one field being changed so that it identifies said off-screen pixmap and for transferring to said one resident pixmap the defined image.

4. A method for use in apparatus arranged to convert a drawing instruction into respective memory locations defining an image, said method comprising the steps of allocating blocks of memory locations of a first memory for use as respective resident pixmaps, allocating at least one block of memory locations of a second memory for use as an off-screen pixmap, responding to receipt of a drawing instruction defining a particular image and specifying one of said resident pixmaps by changing said drawing instruction so that it specifies said off-screen pixmap and then passing to a graphics processor, operable for defining said image in said off-screen pixmap, said changed drawing instruction, and transferring to said one resident pixmap the contents of said off-screen pixmap when said image has been defined in said off-screen pixmap.

5. The method of claim 4 wherein the step of transferring includes the step of responding to receipt of another subsequent drawing instruction by then transferring to said one resident pixmap said contents of said off-screen pixmap.

* * * * *

UNITED STATES PATENT AND TRADEMARK OFFICE
CERTIFICATE OF CORRECTION

PATENT NO. : 5,020,003

DATED : May 28, 1991

INVENTOR(S) : David Moshenberg

It is certified that error appears in the above-identified patent and that said Letters Patent is hereby corrected as shown below:

Column 2, line 8, "100" should be deleted.
Column 5, line 58, after "231." add --The program then proceeds to block 305 where it modifies the drawing instruction to reference off-screen pixmap 231.--.

Signed and Sealed this

Tenth Day of November, 1992

*Attest:*

DOUGLAS B. COMER

*Attesting Officer*

*Acting Commissioner of Patents and Trademarks*